(12) United States Patent
Matsuda

(10) Patent No.: US 8,743,404 B2
(45) Date of Patent: Jun. 3, 2014

(54) IMAGE FORMING APPARATUS, INFORMATION PROCESSING METHOD, AND STORAGE MEDIUM

(71) Applicant: Canon Kabushiki Kaisha, Tokyo (JP)

(72) Inventor: Hiroshi Matsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 13/631,199

(22) Filed: Sep. 28, 2012

(65) Prior Publication Data

US 2013/0088732 A1   Apr. 11, 2013

(30) Foreign Application Priority Data

Oct. 6, 2011 (JP) ................. 2011-222119

(51) Int. Cl.
 *G06F 3/12* (2006.01)
(52) U.S. Cl.
 USPC .......... 358/1.15; 358/1.9; 358/1.13; 358/1.14
(58) Field of Classification Search
 None
 See application file for complete search history.

(56) References Cited

U.S. PATENT DOCUMENTS

| | | | | |
|---|---|---|---|---|
| 8,189,221 | B2 * | 5/2012 | Matsumoto et al. | 358/1.15 |
| 8,446,611 | B2 * | 5/2013 | Seko | 358/1.14 |
| 8,526,022 | B2 * | 9/2013 | Takeishi | 358/1.13 |
| 2007/0223027 | A1 * | 9/2007 | Shindo et al. | 358/1.13 |
| 2010/0277757 | A1 | 11/2010 | Smith | |
| 2011/0255103 | A1 * | 10/2011 | Matsuda | 358/1.9 |

FOREIGN PATENT DOCUMENTS

| | | |
|---|---|---|
| JP | 4417153 B2 | 2/2010 |
| JP | 4424718 B2 | 3/2010 |

* cited by examiner

*Primary Examiner* — Dung Tran
(74) *Attorney, Agent, or Firm* — Canon USA Inc IP Division

(57) ABSTRACT

An image forming apparatus includes first and second interpreters configured to interpret page description language data and generate intermediate data. The apparatus further includes a setting unit configured to set an image quality priority mode for one of the first and second interpreters and a color/monochrome determination priority mode for the other of the first and second interpreters. Either the first interpreter or the second interpreter, for which the color/monochrome determination priority mode is set, skips the generation of the intermediate data for a processing target page in a case where it is determined that the processing target page is a color page.

11 Claims, 11 Drawing Sheets

FIG.3

| |
|---|
| PAGE START |
| PAGE ATTRIBUTE SETTING |
| IMAGE RENDERING |
| CHARACTER RENDERING |
| STROKE RENDERING |
| FILL RENDERING |
| PATTERN SETTING |
| CLIPPING PATH SETTING |
| COLOR SETTING |
| PAGE END |

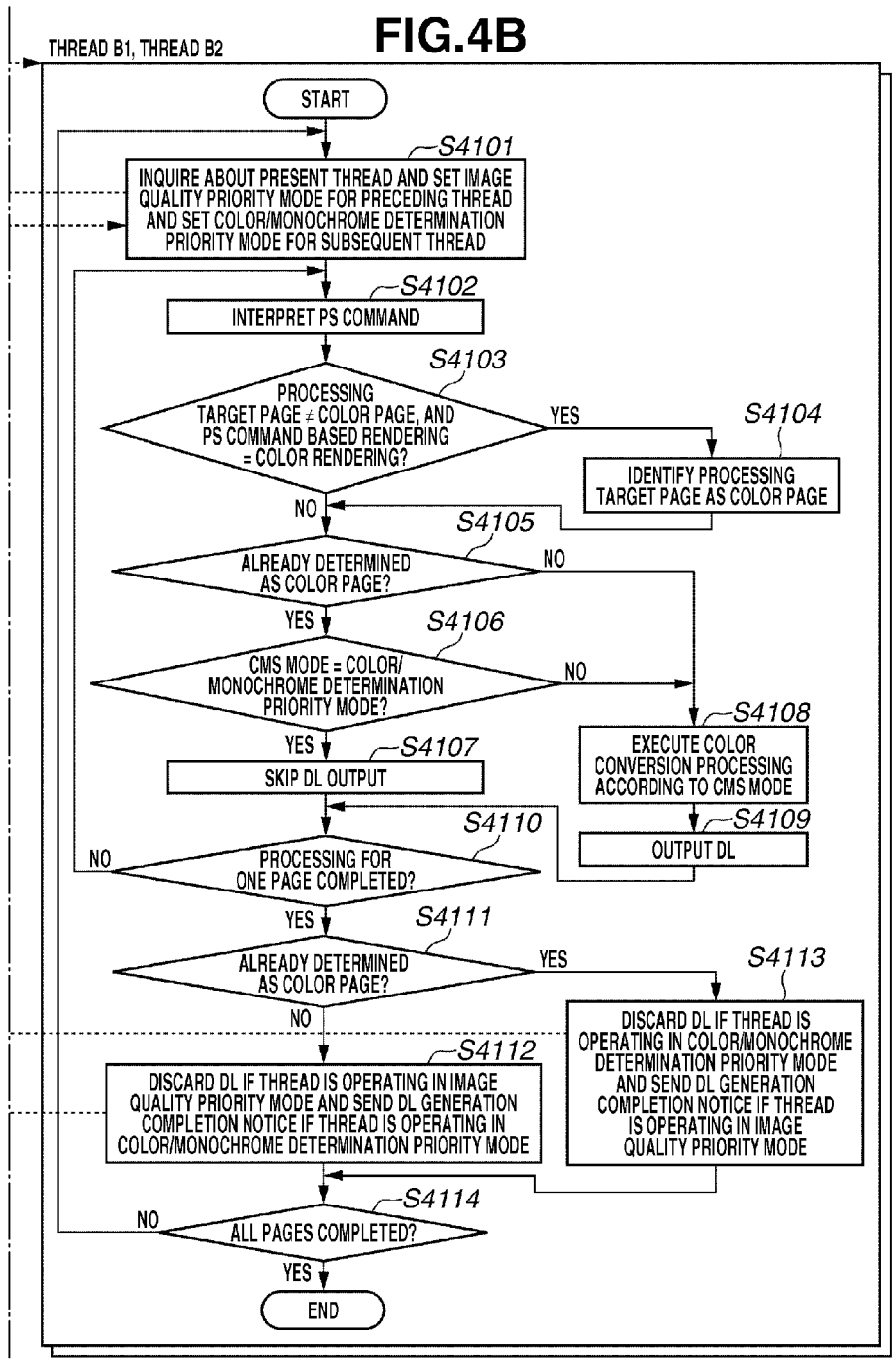

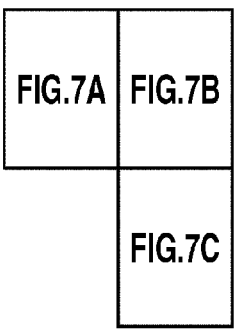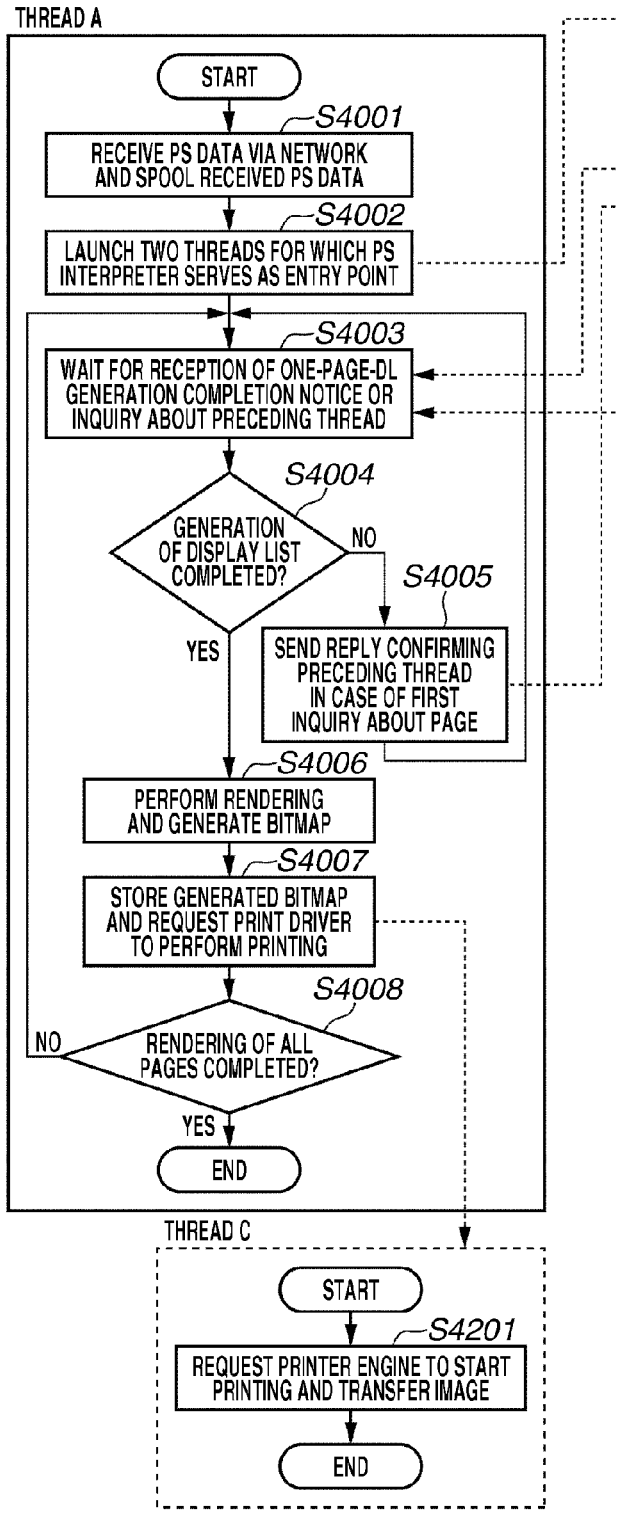

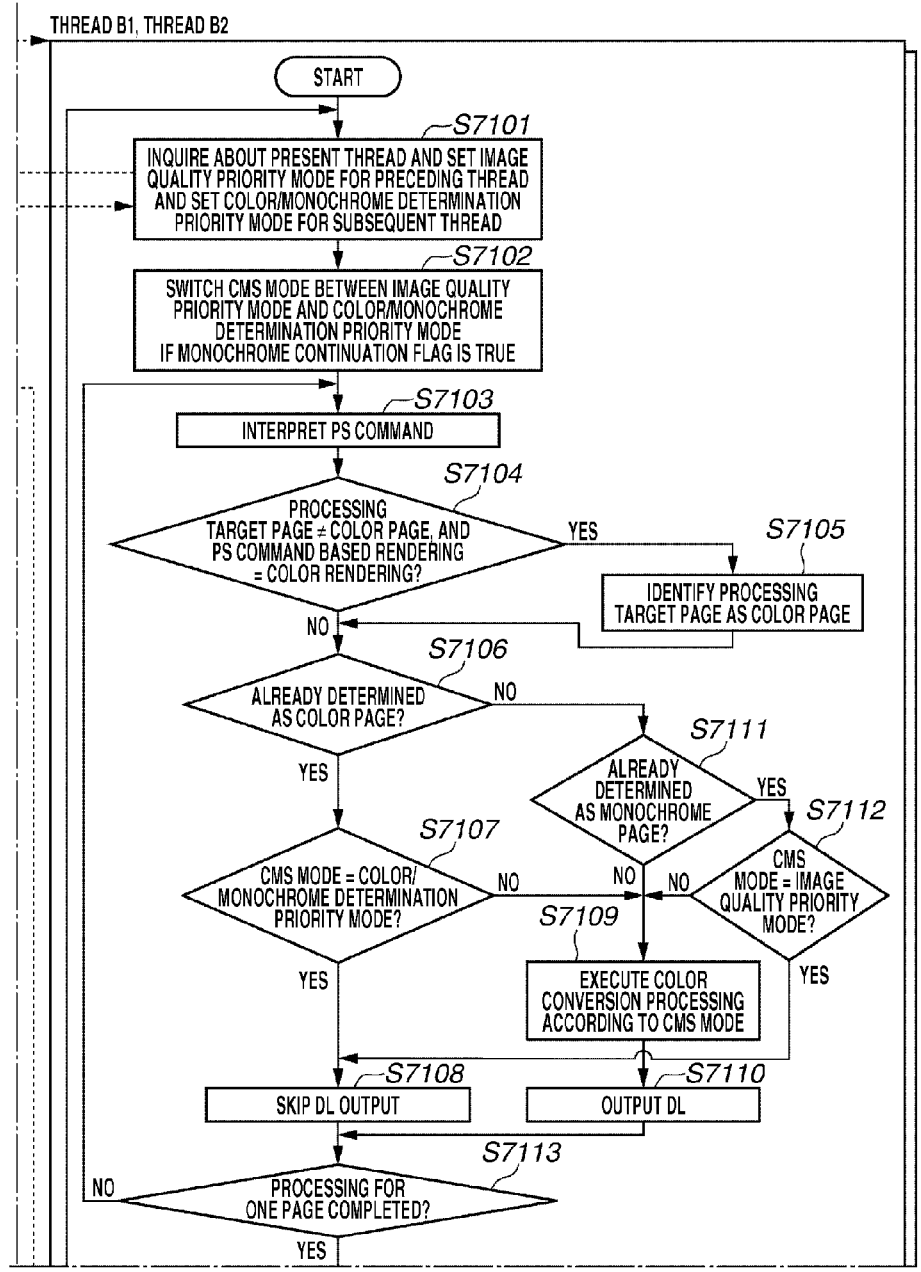

IMAGE FORMING APPARATUS, INFORMATION PROCESSING METHOD, AND STORAGE MEDIUM

BACKGROUND OF THE INVENTION

1. Field of the Invention

The present invention relates to an image forming apparatus, an information processing method, and a storage medium.

2. Description of the Related Art

An image forming apparatus, such as a copying machine or a laser printer, includes a controller that is capable of receiving print data from a host computer, interpreting the received data and performing image processing on the received data, and generating image data to be printed. The host computer includes an application and a printer driver that can generate print data described using a page description language (PDL) and can transmit the data to the controller via a network or an appropriate communication medium. The PDL is, for example, LIPS provided by CANON Inc. or PostScript (registered trademark) provided by Adobe Systems Inc., or PCL (registered trademark) provided by Hewlett-Packard Company.

In a conventional color printer having an output speed different in color output and monochrome output, determining whether the page is a monochrome page or a color page is performed for each page to be processed, for the purpose of improving the total throughput of print processing. Further, if a color printer performs a color output operation for a page exclusively constituted by a gray scale, an obtainable print result will be deteriorative in quality because the printer performs printing by overlapping CMYK toner images.

As an example color/monochrome determination method, it is conventionally known to check CMYK values that constitute each page to be processed and, if CMY values are detected, determining the page is a color page. As another method, it is conventionally known to determine that a page to be processed is a monochrome page if input RGB values that constitute the page are equal to each other. It is conventionally known that a maintenance fee applied to a color output is set differently from a maintenance fee applied to a monochrome output in a color multifunction peripheral. In which case, the total maintenance fee may become an unpredicted value for a user.

Hence, as a method capable of controlling color/monochrome determination result, it is conventionally proposed to provide an additional configuration capable of compensating a gray color in color management (i.e., color conversion processing). According to the above-described conventional method, the color/monochrome determination can be effectively performed after the color management. In particular, according to PostScript, it is difficult to perform the color/monochrome determination for the page before performing the color management. In this respect, as discussed in Japanese Patent No. 4424718, it is conventionally known to perform the color/monochrome determination according to color management settings.

On the other hand, a massive amount of complicated PDL data tends to be generated due to improvement in performance of a host computer as well as advancement in functionality of each application. Although improvement in general CPU performance enables a controller to have improved PDL processing capabilities, the PDL processing may still be insufficient to attain a required engine throughput.

Recently, improvement of the CPU clock has been substantially saturated. There is a trend toward using a multi-core processor that incorporates a plurality of cores in a single package. To fully use the performance of the multi-core CPU, it is necessary to perform parallel PDL processing. For example, as one of conventionally proposed methods, a job parallel processing method is known by using a plurality of cores to concurrently perform PDL processing on a plurality of jobs. The job parallel processing method is effective to improve the entire productivity when a large amount of job is processed.

However, the time required for a multi-core processor to perform PDL processing on a single job is not different from the time required for a single-core processor to perform the same processing.

Further, as another method, there is a page parallel processing method known which uses a plurality of cores to concurrently perform PDL processing on a plurality of pages included in a single job. The page parallel processing method is effective to improve the processing speed per job. However, it is required to describe print data using a page-independent PDL that has no dependence relationship between pages.

Further, the time required for a multi-core processor to perform PDL processing on a single page of a job is not different from the time required for a single-core processor to perform the same processing. It will take a long time to perform PDL processing on a page rendered in a complicated manner. It may become a bottleneck even in the page parallel processing method.

Further, as another method, there is an object parallel processing method that is known which uses a plurality of cores to concurrently perform PDL processing on a plurality of rendering objects included in a single page. The object parallel processing method is effective to reduce the PDL processing time per single page. However, it is known that the calculation cost required in division and collection of objects is high. In view of the efficiency in parallel processing, either the job parallel processing method or the page parallel processing method is desired.

The page parallel processing method can be classified into a complete page parallel processing method and a partial page parallel processing method. The complete page parallel processing method discussed in Japanese Patent No. 4417153 is a method for completely performing parallel processing for each page with respect to PDL processing that can be executed by a controller CPU. On the other hand, the partial page parallel processing method discussed in U.S. Patent Application Publication No. 2010/0277757 is a method for performing parallel processing for a part of PDL processing and performing duplicate processing for the rest.

An interpreter that interprets PDL data is required to start processing with the first page and sequentially process the remaining pages in ascending order if the PDL has a dependence relationship between the pages, because a processing result obtained through the processing for preceding pages is stored as a status in the interpreter. However, it is relatively easy to remove the dependency between pages for a graphics library, a display list generation unit, and a renderer, which are subordinate components of the interpreter.

Therefore, the interpreter can perform duplicate processing to perform parallel processing, for each page, for the subordinate components. Although the partial page parallel processing is inferior to the complete page parallel processing method in concurrency, the partial page parallel processing is advantageous in performing parallel processing on a PDL that has dependence relationship between pages.

In a case where the color management precedes the color/monochrome determination, the image quality of an output image may deteriorate if it is required to perform the determination faithfully to the original data. For example, a portion where the original data looks like a gray scale requires color conversion processing according to which none of the CMY colors is applied after the color management (hereinafter, referred to as "color/monochrome determination priority mode").

If none of the CMY colors is applied, namely when only the K color is used to output an image, a significant deterioration may be recognized in image quality (e.g., coarseness or collapse of gray gradation). If only the K color is applied to an area exceeding a predetermined size, the coarseness will increase significantly, as understood in comparison with an image obtainable by applying a plurality of (e.g., CMYK) colors. Further, the gradation tends to collapse because an original data portion where the gradation of a high-density region is expressed using four (i.e., CMYK) colors is expressed using only the K color or by applying a smaller amount of color.

The reason why a smaller application amount is used in expression is because reducing the usage amounts of respective CMY colors is required as a whole to maintain the continuity with a neighboring gray portion even when the original data includes a mixing portion of a gray color and a chromatic color. Color conversion processing that applies CMY colors after the color management (hereinafter, referred to as "image quality priority mode") is desired to obtain excellent image quality, even at a portion where the original data looks like a gray scale. In short, the fidelity to original data in the color/monochrome determination is in a trade-off relationship with the quality of a printed image.

The above-described problem arises when the color management is performed prior to the color/monochrome determination. In other words, the above-described problem does not arise if the color/monochrome determination is performed prior to the color management. In this case, the image quality priority mode can be selected if the determination result is "color", and the color/monochrome determination priority mode can be selected if the determination result is "monochrome."

However, the color management if performed after the color/monochrome determination may induce a significant deterioration in performance. For example, it may be required to check the entire data of one page to perform the color/monochrome determination for a processing target page. In such a case, data spool of at least one page is required. Although there is a method using a display list or a rendering image, in the data spool, it is necessary to hold information required in the color management for the following processing. This is one of the factors that may cause deterioration in performance.

SUMMARY OF THE INVENTION

To solve the above-described problems, the present invention is directed to a technique capable of performing image forming processing that is satisfactory in color/monochrome determination fidelity as well as in color image quality while minimizing deterioration in performance.

According to an aspect of the present invention, an image forming apparatus includes first and second interpreters configured to interpret page description language data and generate intermediate data. The image forming apparatus further includes a mode setting unit configured to set an image quality priority mode to cause one of the first and second interpreters to generate the intermediate data through image quality prioritization processing, and set a color/monochrome determination priority mode to cause the other of the first and second interpreters to generate the intermediate data through color/monochrome determination prioritization processing. Either the first interpreter or the second interpreter, for which the color/monochrome determination priority mode is set, skips the generation of the intermediate data for the processing target page if it is determined that the processing target page is a color page.

An example of the image forming processing according to the present invention is satisfactory in color/monochrome determination fidelity as well as in color image quality while minimizing deterioration in performance.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates example contents of a DL generation request.

DESCRIPTION OF THE EMBODIMENTS

Various exemplary embodiments, features, and aspects of the invention will be described in detail below with reference to the drawings.

Exemplary embodiments of the present invention are described in detail below with reference to attached drawings. An image forming apparatus according to an example of the present invention can perform print processing according to the above-described partial page parallel processing method. More specifically, the following image forming apparatus is configured to perform parallel processing on a part of sequential processing that includes interpreting page description language data, generating intermediate data, and generating an image based on the intermediate data and is configured to perform duplicate processing on the rest of the processing.

Figure 1:
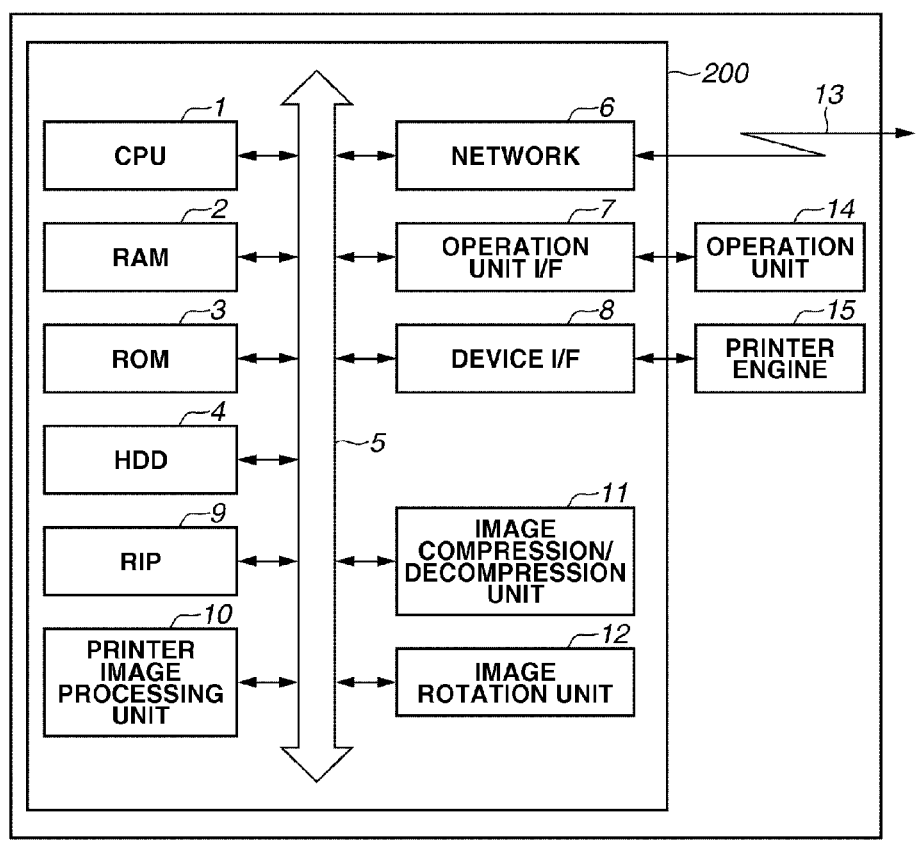
FIG. 1 illustrates an example of a hardware configuration of an image forming apparatus according to an exemplary embodiment of the present invention.

FIG. 1 illustrates an example hardware configuration of the image forming apparatus. In the first exemplary embodiment, although the image forming apparatus performs all of the required processing, it is useful that most of the processing is separately executed by a host computer connected to the image forming apparatus via a network.

A controller unit 200 can control input/output of image signals and device information. A central processing unit (CPU) 1 can load a program from a read only memory (ROM) 3 or a hard disk drive (HDD) 4 into a random access memory (RAM) 2, and can execute the loaded program. Further, the CPU 1 can control each device connected to a system bus 5.

The CPU 1 is a dual-core processor that includes two cores, which can simultaneously execute two control programs in a parallel fashion. The CPU 1 may contain additional cores without going beyond the scope and spirit of the present invention as recited in the claims. The RAM 2 is functionally operable as a main memory or a work area of the CPU 1. A boot program, which can be executed when the power source is turned on, is stored in the ROM 3. An operating system and control programs, which are installed for the image forming apparatus, are stored in the HDD 4. Further, the HDD 4 can be used to store mass storage data (e.g., image data and print data) temporarily or for a long time.

A network 6 is connected to a local area network 13 to input and output print data and device information. An operation unit interface (I/F) 7 is an interface unit dedicated to an operation unit 14. The operation unit I/F 7 can output image data to the operation unit 14 that can display an image on its screen based on the received image data. Further, if any information is input from a user of the apparatus via the operation unit 14, the operation unit I/F 7 can transmit the received information to the CPU 1. The operation unit 14 includes a liquid crystal panel and a sound source, which are respectively operable as an output device. Further, the operation unit 14 includes a touch panel and hard keys, which are respectively operable as an input device.

The controller unit 200 is connected to a printer engine 15 via a device I/F 8. The device I/F 8 can perform transmission of image signals, instruction of device operations, and reception of device information, based on instructions from the CPU 1. The printer engine 15 is an electrophotographic or inkjet type output machine that can output image signals from the controller unit 200 to an external medium.

A raster image processor (RIP) 9 is a dedicated hardware that can develop a display list (hereinafter, referred to as DL) into a raster image. The RIP 9 can speedily process each DL generated on the RAM 2 by the CPU 1 in parallel with execution of the CPU 1. A printer image processing unit 10 can perform image correction and half-toning processing on print output image data. An image rotation unit 12 can rotate image data. An image compression/decompression unit 11 can perform JPEG compression and decompression processing on multi-valued image data and JBIG, MMR, or MH compression and decompression processing on binary image data.

Figure 2A:
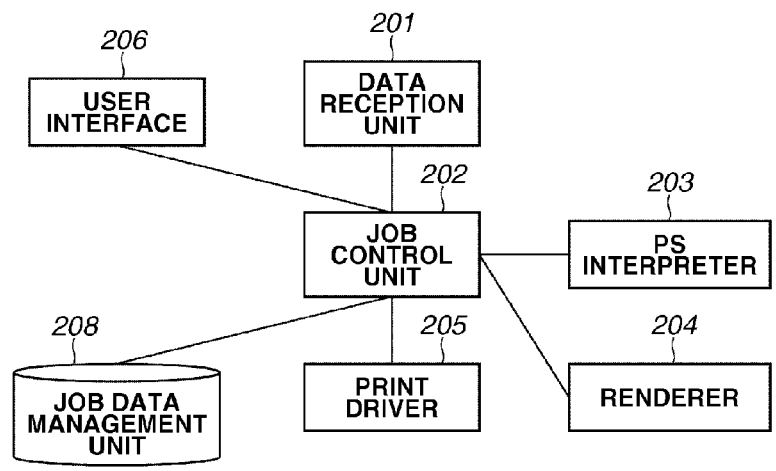
FIG. 2A illustrates an example of a software module configuration of the image forming apparatus.

FIG. 2A illustrates an example of a software module configuration of the image forming apparatus. Each software module illustrated in FIG. 2A is stored in the HDD 4, as a program, which can be loaded into the RAM 2 and can be executed by the CPU 1. More specifically, the operating system (OS) running on the CPU 1 loads each software module into the RAM 2. The execution right of each module is given for each thread that can be executed independently.

A data reception unit 201 can receive print data transmitted from the host computer. The print data received by the data reception unit 201 can be stored in a job data management unit 208 via a job control unit 202. The job control unit 202 can perform a sequential job control that includes data reception and print processing. A PS interpreter 203 can interpret PostScript data and can generate a DL, which is intermediate data. The generated DL can be stored in the job data management unit 208 via the job control unit 202.

A renderer 204 is a module that has the capability of generating a bitmap image based on the DL. Most of the processing to be performed by the renderer 204 can be executed by the RIP 9 (i.e., a dedicated hardware). The generated bitmap image can be stored in the job data management unit 208 via the job control unit 202. A print driver 205 can transmit a print instruction together with a bitmap image to the printer engine 15 via the device I/F 8.

A user interface 206 is a module that has the capability of controlling the operation unit 14 via the operation unit I/F 7. The user interface 206 can generate data to be displayed on a liquid crystal panel of the operation unit 14 and can update the content to be displayed on the liquid crystal panel according to an instruction input via a touch panel. Further, if the instruction having been input via the touch panel is a job execution instruction, the user interface 206 transmits the job execution instruction to the job control unit 202.

The job data management unit 208 is a database that can store and manage print data, DL, and bitmap images temporarily or for a long time. The bitmap image is an example of the images that can be stored in the job data management unit 208.

Figure 2B:
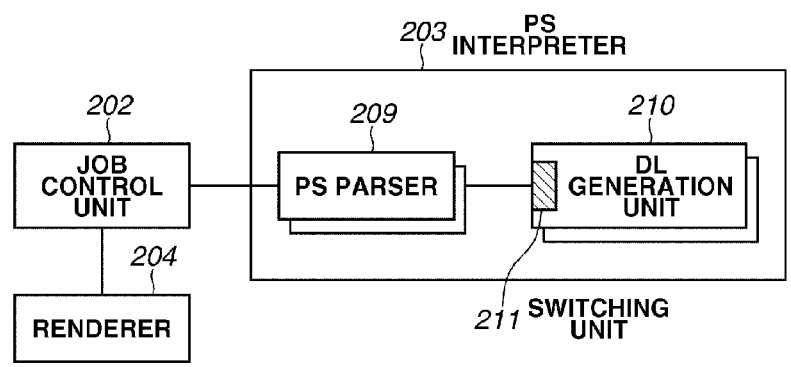
FIG. 2B illustrates an example of a detailed software module configuration of a PS interpreter illustrated in FIG. 2A.

FIG. 2B illustrates an example of a detailed software module configuration of the PS interpreter 203 illustrated in FIG. 2A. The PS interpreter 203 includes a PS parser 209 that can interpret PS data and extract a rendering command. The PS parser 209 can request a DL generation unit 210 to generate a DL. When the DL generation unit 210 receives a DL generation request from the PS parser 209, the DL generation unit 210 generates the requested DL. The PS parser 209 and the DL generation unit 210 are closely associated with each other. Every time when the PS parser 209 extracts a rendering command, the DL generation unit 210 is evoked.

FIG. 3 illustrates detailed contents of the DL generation request that can be issued by the PS parser 209. A switching unit 211 is a module that has the capability of selectively receiving the DL generation request from the PS parser 209. In the present exemplary embodiment, the PS parser 209 can perform page-dependent processing and the DL generation unit 210 can perform page-independent processing.

In some cases, a resource defined in the preceding page may be referred to for the next page. Therefore, the PS parser 209 is required to interpret the PS data with reference to the page order. On the contrary, the DL generation request illustrated in FIG. 3 does not depend on the processing having been performed for the preceding page. The DL generation unit 210 is not required to perform the processing according to the page order. Further, each of the PS parser 209 and the DL generation unit 210 has a reentrant structure and can realize multiple launches. One PS parser 209 and one DL generation unit 210 can be executed on one thread. The PS data is an example of the page description language data.

Figure 4:
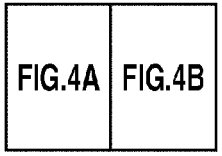
FIG. 4 (4A and 4B) is a flowchart illustrating a basic flow of print processing that can be executed by a controller according to an exemplary embodiment of the present invention.
Figure 4A:
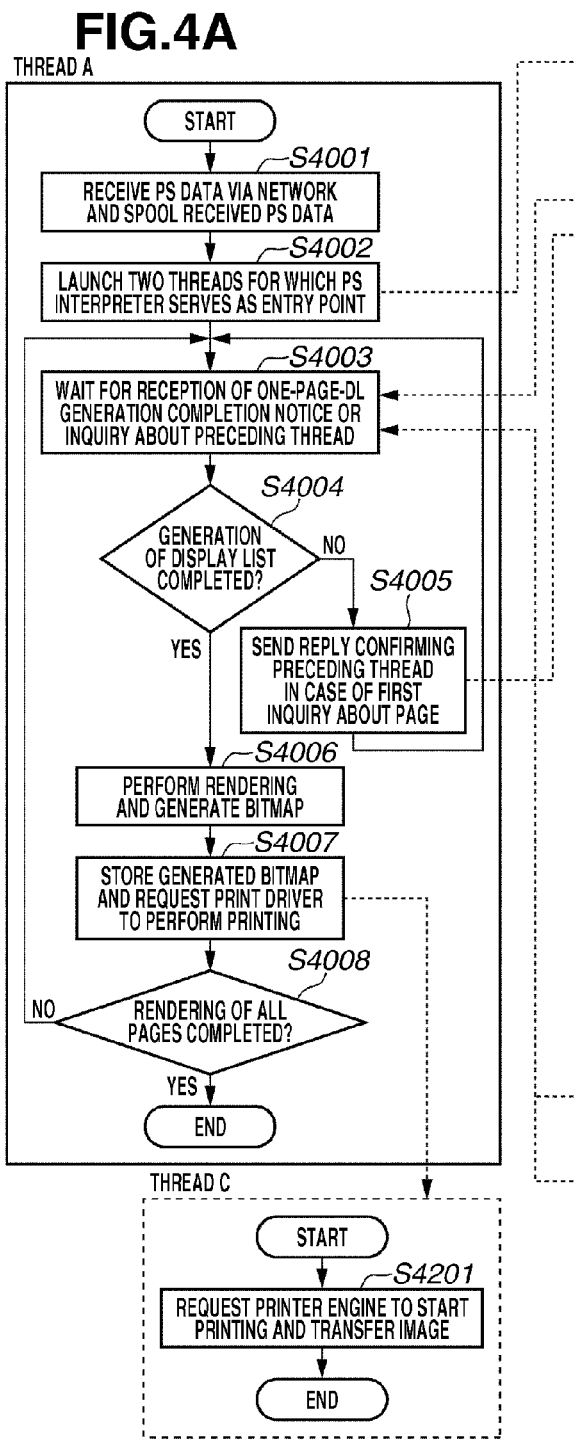

FIG. 4 is a flowchart illustrating a basic flow of print processing that can be executed by the controller unit 200. The processing illustrated in FIG. 4 can be executed by respective software modules illustrated in FIG. 2. Further, the present flowchart can be realized when programs that correspond to respective software modules illustrated in FIG. 2 are loaded from the HDD 4 into the RAM 2 and executed by the CPU 1.

In the present flowchart, the controller unit 200 executes four threads (i.e., thread A, thread B1, thread B2, and thread C) in a parallel fashion. Each thread is subjected to time division processing that can be performed by the operating system. The execution rights for respective time-division processed threads are successively allocated to two cores of the CPU 1. The unit of time division is sufficiently small. Therefore, parallel operations by the four threads can be regarded as being substantially simultaneous.

However in an example of the present invention, at each time, the maximum number of threads that can be actually executed simultaneously is only two, because the CPU 1 is a dual-core processor constituted by two cores as described above. The multithreading processing is a technique that can be performed by the operating system is generally and widely known, and is not described in detail.

The thread A is a main thread that performs print processing. The thread B1 and the thread B2 can be dynamically generated in accordance with the execution of the thread A. The thread C is a resident thread that can be generated by the operating system when the image forming apparatus is activated.

In the thread A, first in step S4001, the data reception unit 201 receives print data and the job control unit 202 causes the job data management unit 208 to store the received print data. Next, in step S4002, the job control unit 202 launches two threads (i.e., the thread B1 and the thread B2) for which the PS interpreter 203 serves as an entry point. More specifically, the PS interpreter 203 is mapped in two threads and launched doubly.

Then, the job control unit 202 sends the print data stored in the job data management unit 208 to the PS interpreter 203 and instructs the PS interpreter 203 to interpret the print data. In the present exemplary embodiment, the PS interpreter 203 is launched doubly. Therefore, the PS interpreter 203 simultaneously starts interpreting the same print data in respective threads B1 and B2.

Next, in step S4003, the job control unit 202 waits for reception of an event that informs DL-for-one-page generation completion notice or inquiry about the preceding thread. Each event can be transmitted from the PS interpreter 203 (i.e., the thread B1 and the thread B2) to the job control unit 202 (i.e., the thread A).

The inquiry about the preceding thread is an inquiry about whether the thread which has inquired (i.e., one of two threads of the PS interpreter 203) is precedent in processing for a designated page. The PS interpreter 203 successively interprets PS data and, if processing for a new page is started, inquires about the preceding thread constantly. When the CPU is processing two or more threads which are processing data for the same designated page, the threads which are initiated before a particular thread may be identified as the preceding threads. The preceding thread is precedent in processing a designated page relative to the particular thread. The particular thread is initiated after the preceding thread.

Next, the operation proceeds to step S4004, in which the job control unit 202 determines whether the DL generation completion notice has been received. DL generation is not yet completed at an earlier time after the processing of the flowchart illustrated in FIG. 4 is started. Therefore, the determination result in step S4004 becomes No. If the determination result in step S4004 is No, the operation proceeds to step S4005. In this case, the event received by the job control unit 202 is the inquiry about the preceding thread.

The job control unit 202 sends a reply informing confirmation about a preceding thread if the inquiry is the first inquiry about the designated page and transmits a reply informing confirmation about a non-preceding thread if the inquiry is the second inquiry.

The job control unit 202 stores the presence of an inquiry about the processing target page, and determines whether the inquiry is the first inquiry or the second inquiry. Whatever page the plurality of threads is processing together is the processing target page. If the job control unit 202 completes the processing in step S4005, the operation returns to step S4003.

If the determination result in step S4004 is Yes, the operation proceeds to step S4006, in which the job control unit 202 performs rendering and generates CMYK bitmap data. Next, in step S4007, the job control unit 202 stores the generated bitmap data in the job data management unit 208 and requests the print driver 205 to perform printing. The job control unit 202 can execute the print request by transmitting a rendering completion notice to the print driver 205.

The print driver 205 executes the processing as the thread C (i.e., another thread different from the thread A) to perform processing in synchronization with the processing of the printer engine 15.

If the print driver 205 receives the request, then in step S4201, the print driver 205 transmits a print start request command to the printer engine 15 and transfers the image data. The processing to be performed in step S4201 is described in detail below.

Next, the operation proceeds to step S4008, in which the job control unit 202 determines whether the rendering processing has been completed for all pages. If the determination result in step S4008 is Yes, the job control unit 202 terminates the processing of the flowchart illustrated in FIG. 4. If the determination result in step S4008 is No, the operation returns to step S4003, in which the job control unit 202 repeats the above-described processing.

In the thread B1 and the thread B2, first in step S4101, the PS interpreter 203 inquires the job control unit 202 about whether the present thread is a thread that starts in advance of the processing for the processing target page. If the present thread is the preceding thread, the PS interpreter 203 sets the image quality priority mode as the CMS mode for the present thread. If the present thread is the subsequent thread, the PS interpreter 203 sets the color/monochrome determination priority mode as the CMS mode for the present thread.

The CMS mode is a flag variable stored in the RAM 2, and can be referred to when the color conversion processing is executed. A CMS mode storage area dedicated to the thread B1 and a CMS mode storage area dedicated to the thread B2 are prepared independently. Either the thread B1 or the thread B2 is set to the image quality priority mode and the other is set to the color/monochrome determination priority mode. The CMS mode setting of each thread is variable depending on a progress status of the processing. Two CMS modes are described in detail below.

Next, the operation proceeds to step S4102, in which the PS interpreter 203 interprets a PS command. Next, the operation proceeds to step S4103, in which the PS interpreter 203 determines whether the processing target page has not been determined as a color page and the PS command based rendering is color rendering. If the color space is CMYK, the PS interpreter 203 can check if $C \neq 0$, or $M \neq 0$, or $Y \neq 0$ in determining whether the PS command based rendering is the color rendering. Further, if the color space is RGB, the PS interpreter 203 can check if R=G=B. Further, if the color space is CIEBased, the PS interpreter 203 can check if $a \neq 0$ or $b \neq 0$ in the L*a*b color system.

If the determination result in step S4103 is Yes, the operation proceeds to step S4104, in which the PS interpreter 203 identifies the processing target page as a color page. The color/monochrome determination result can be expressed using three values (e.g., color, monochrome, and undetermined) for each page and can be stored in the RAM 2. The color/monochrome determination result can be commonly referred to by the thread B1 and the thread B2. Accordingly, if the processing target page is once identified as a color page by the preceding thread (i.e., either the thread B1 or the thread B2), the processing target page can be similarly identified as a color page by the subsequent thread.

Next, the operation proceeds to step S4105, in which the PS interpreter 203 determines whether the processing target page has been already determined as a color page. If the determination result in step S4105 is Yes, the operation proceeds to step S4106, in which the PS interpreter 203 determines whether the CMS mode is the color/monochrome determination priority mode. If the determination result in step S4106 is Yes, the operation proceeds to step S4107, in which the PS interpreter 203 skips a DL output operation for the target rendering.

As described above, generation/non-generation of DL can be switched by the switching unit 211. If the switching unit 211 ignores the DL generation request, DL generation processing for the processing target page is not performed. Therefore, the processing speed can be increased.

If the determination result in step S4105 is No, or if the determination result in step S4106 is No, the operation proceeds to step S4108, in which the PS interpreter 203 executes color conversion processing according to the CMS mode. The color conversion processing can be executed by a CMS engine provided in the PS parser 209. The CMS engine is a module that has the capability of performing color management processing. The CMS engine can generate a printer engine unique output color (CMYK) after the input color is converted into an absolute color space.

Various color spaces (e.g., Device color space, CIEBased color space, and special color space) are regulated for the PostScript language. An input color designated in the Device color space is subjected to the color conversion processing using a designated profile (e.g., RGB source profile, or CMYK simulation profile) selected from an ICC profile group prepared beforehand.

An input color designated in the CIEBased color space is subjected to the color conversion processing using a conversion table, a conversion function, and a conversion matrix designated in the CIEBased color space. The conversion from the absolute color space to a printer engine unique color space can be performed by using an output profile or Color Rendering Dictionary regulated by PostScript. Two profiles are selectively usable as the output profile. One profile is a gray compensation profile that prioritizes an expression of a gray scale using only the K color. The other profile is a normal profile that prioritizes an expression of a gray scale using four (CMYK) colors.

A spot color designated in a Separation color space or in a DeviceN color space is converted into a process color (CMYK) using a Named ICC profile. If the CMS mode is the image quality priority mode, the PS interpreter 203 selects the normal profile as the output profile. If the CMS mode is the color/monochrome determination priority mode, the PS interpreter 203 selects the gray compensation profile as the output profile.

Next, the operation proceeds to step S4109, in which the PS interpreter 203 performs a DL output operation for the target rendering. Color values of each rendering object are expressed using converted CMYK values on the display list. Accordingly, a display list generated in the image quality priority mode is different from a display list generated in the color/monochrome determination priority mode.

Next, the operation proceeds to step S4110, in which the PS interpreter 203 determines whether processing for one page has been completed. If the determination result in step S4110 is No, the operation returns to step S4102, in which the PS interpreter 203 repeats the above-described processing. If the determination result in step S4110 is Yes, the operation proceeds to step S4111, in which the PS interpreter 203 determines whether the processing target page has been already determined as a color page. In this case, if the determination result is No, more specifically when the processing target is not yet determined as a color page even after the processing for one page has been completed, it means that the processing target page is a monochrome page.

If the determination result in step S4111 is No, the operation proceeds to step S4112, in which the PS interpreter 203 discards the DL of the processing target page if the thread is operating in the image quality priority. Further, if the thread is operating in the color/monochrome determination priority, the PS interpreter 203 sends a DL generation completion notice to the job control unit 202. If the determination result in step S4111 is Yes, the operation proceeds to step S4113, in which the PS interpreter 203 discards the DL of the processing target page if the thread is operating in the color/monochrome determination priority. Further, if the thread is operating in the image quality priority, the PS interpreter 203 sends a DL generation completion notice to the job control unit 202.

If the processing in step S4112 or step S4113 has been completed, the operation proceeds to step S4114, in which the PS interpreter 203 determines whether the above-described processing has been completed for all pages. If the determination result in step S4114 is No, the operation returns to step S4101, in which the PS interpreter 203 repeats the above-described processing. If the determination result in step S4114 is Yes, the PS interpreter 203 terminates the processing of the flowchart illustrated in FIG. 4.

The processing to be performed by the PS interpreter 203 has a reentrant configuration. Therefore, the interpreter 203 can simultaneously process two PS data. The time required for PS data interpretation processing and DL generation processing is greatly dependent on the amount of data and complexity of each page included in the PS data.

Accordingly, the DL generation completion time of each page in respective threads B1 and B2 does not always correspond to the page order. Page order rearrangement in print can be executed by the print driver 205 according to the page order. For synchronization, the thread A and the thread C have very long waiting times (although described in detail below for the thread C). As a result, the execution time of two cores included in the CPU 1 is mostly allocated to the thread B1 and the thread B2.

Figure 5:
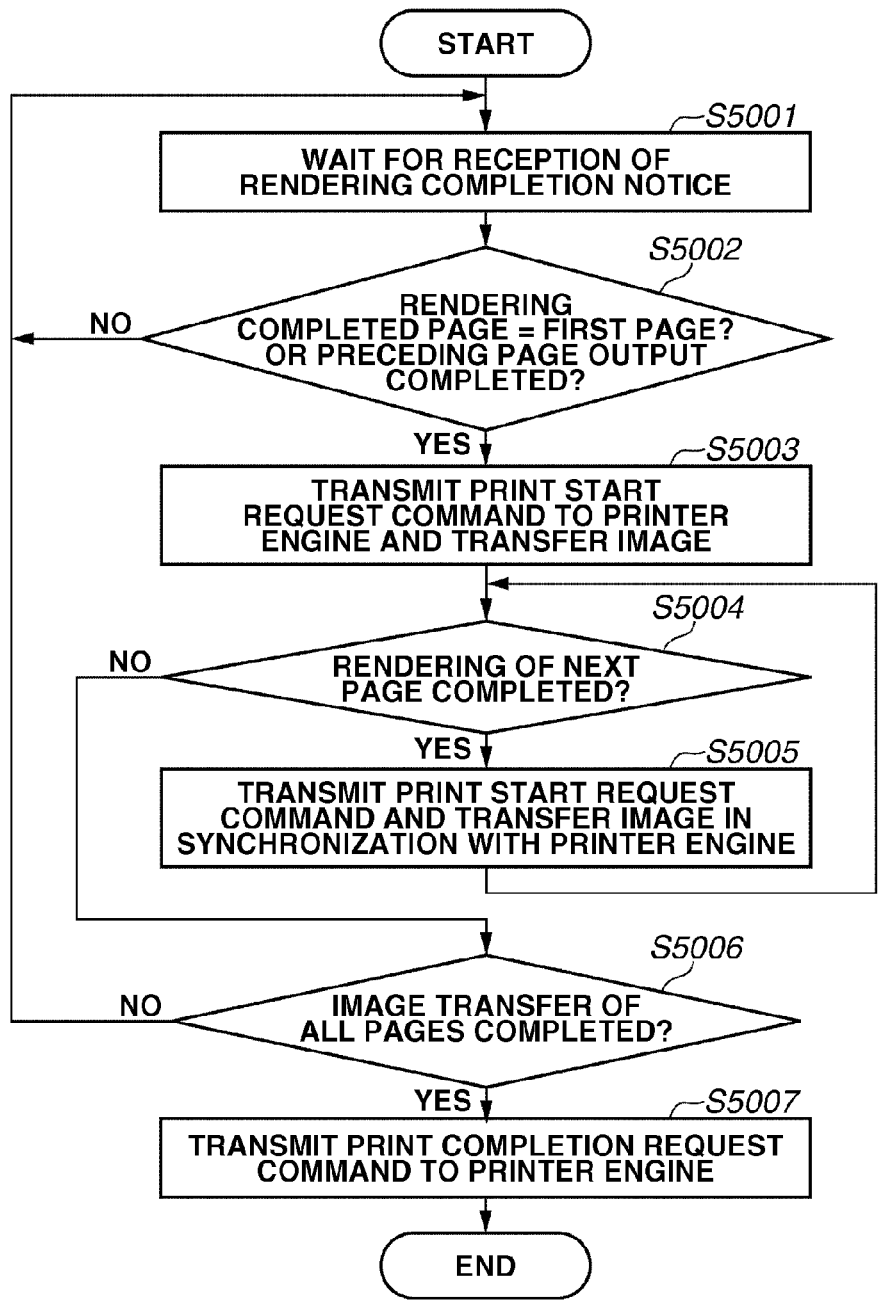
FIG. 5 is a flowchart illustrating image transfer processing that can be performed by a print driver according to an exemplary embodiment of the present invention.

FIG. 5 is a flowchart illustrating image transfer processing that can be executed by the print driver 205. In other words, FIG. 5 is a flowchart illustrating details of the processing to be performed in step S4201 illustrated in FIG. 4. First, in step S5001, the print driver 205 waits for reception of the rendering completion notice. The rendering completion notice can be transmitted in step S4007, as described above, by the job control unit 202.

Next, in step S5002, the print driver 205 determines whether the rendering processing completed page is the first page of the job, or printout processing for the preceding page has been completed. If the determination result in step S5002 is No, the operation returns to step S5001 in which the print driver 205 waits until the rendering processing for the preceding page is completed. As described above, completion of the rendering of each page does not always correspond to the page order.

If the determination result in step S5002 is Yes, the operation proceeds to step S5003, in which the print driver 205 transmits the print start request command to the printer engine 15 and transfers the image. Further, the print driver 205 synchronizes the processing to be executed in step S5003 with the processing of the printer engine 15. The output speed of the printer engine 15 is limited to a predetermined maximum value. If the RIP processing speed is excessively high, the controller unit 200 waits for a while until the printer engine 15 completes the print output operation.

Next, in step S5004, the print driver 205 determines whether the next page has been already subjected to the rendering processing. If the determination result in step S5004 is Yes, the operation proceeds to step S5005, in which the print driver 205 transmits the print start request command and transfers the image in synchronization with the printer engine 15. Then, the operation returns to step S5004 in which the print driver 205 repeats similar processing. All pages having been already subjected to the rendering processing can be output through the processing in steps S5004 and S5005.

If the determination result in step S5004 is No, the operation proceeds to step S5006, in which the print driver 205 determines whether image transfer of all pages has been completed. If the determination result in step S5006 is Yes, the operation proceeds to step S5007, in which the print driver 205 transmits a print completion request command to the printer engine 15. If the determination result in step S5006 is No, the operation returns to step S5001, in which the print driver 205 repeats the above-described processing.

Figure 6A:
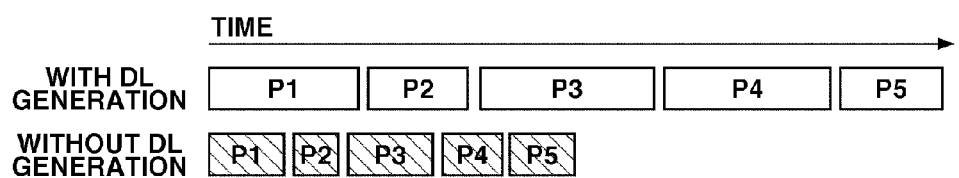
FIG. 6A illustrates processing time required to process specific data of five color pages in a case where DL generation is performed and in a case where DL generation is not performed.
Figure 6B:
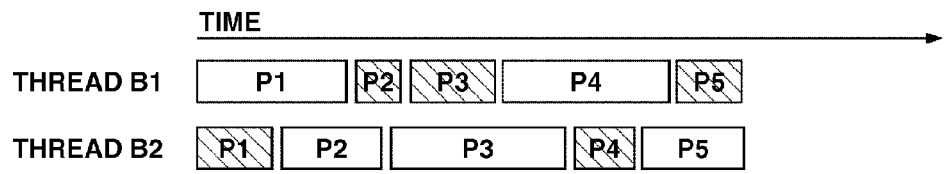
FIG. 6B is a timing chart in a case where the specific data illustrated in FIG. 6A is subjected to only the partial page parallel processing.

FIGS. 6A and 6B are timing charts illustrating examples of the information processing according to the present exemplary embodiment of the present invention. FIG. 6A is a timing chart illustrating processing for specific data of five color pages in a case where the DL generation is performed as well as in a case where the DL generation is not performed. According to the example illustrated in FIG. 6A, the entire processing time including no DL generation is substantially the half of the entire processing time including the DL generation. However, actual processing time is variable depending on the content of each PS data.

FIG. 6B is a timing chart illustrating partial page parallel processing exclusively applied to the specific data illustrated in FIG. 6A, as an example method for allocating the DL generation to the preceding thread (B1 or B2) at page start time. First, the DL generation for the first page is allocated to the thread B1. The thread B2 does not generate any DL. The thread B2 completes the processing for the first page at an earlier time. When the thread B2 has completed the processing for the first page, no thread is performing DL generation for the second page. Therefore, the DL generation for the second page is allocated to the thread B2.

Next, the thread B2 completes the processing for the second page at an earlier time. The DL generation for the third page is allocated to the thread B2. Similarly, the DL generation for the fourth page is allocated to the thread B1 and the DL generation for the fifth page is allocated to the thread B2. As apparent from the comparison between FIG. 6A and FIG. 6B, performing the partial page parallel processing is effective at reducing the processing time.

Figure 6C:
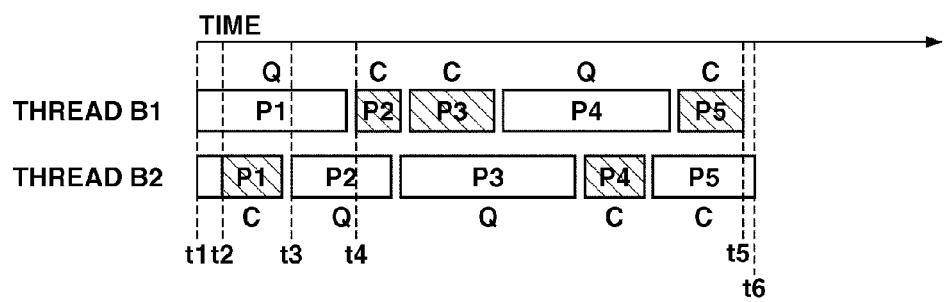
FIG. 6C is a timing chart in a case where the specific data illustrated in FIG. 6A is processed according to the basic flow of print processing illustrated in FIG. 4.

FIG. 6C is a timing chart illustrating the print processing according to the basic flow illustrated in FIG. 4 applied to the specific data illustrated in FIG. 6A. First, at page start time (t1), the CMS mode is set to the image quality priority mode for the thread B1 and to the color/monochrome determination priority mode for the thread B2. In step S4101 illustrated in FIG. 4, the image quality priority mode is set for the preceding thread. Although it is substantially the same, the thread B1 slightly precedes the thread B2 in the processing for the first page illustrated in FIG. 6C, because of the thread launching order B1→B2. Even when the thread B2 precedes the thread B1, there is no substantial difference except that the thread B1 and the thread B2 are replaced in FIG. 6C.

In the timing chart illustrated in FIG. 6C, "Q" represents a page to which the image quality priority mode has been set and "C" represents a page to which the color/monochrome determination priority mode has been set. The processing target page is identified as a color page at time t2 after the processing for the first page is started. If there is any color rendering, the processing target page can be determined as a color page. After that, the thread in the color/monochrome determination priority mode can skip the DL generation.

In general, if the processing target is color data, the color rendering is performed everywhere in the page. Therefore, the probability that color discrimination is accomplished at an early stage of the page processing is high. The thread B2 skips the DL generation at an intermediate point of the first page. Therefore, the processing for the first page accomplishes quickly. Thus, the thread B2 precedes the thread B1 in processing initiation of the second page (see time t3).

Accordingly, in the processing for the second page, the image quality priority mode is set for the thread B2 and the color/monochrome determination priority mode is set for the thread B1. The second page is a color page. Therefore, the thread B2 can immediately identify the processing target page as a color page as soon as the processing for the second page starts. More specifically, when the thread B1 starts processing for the second page (see time t4), the processing target page (i.e., the second page) is already identified as a color page. Therefore, the thread B1 can immediately skip the DL generation.

Similarly, in the processing for the third to the fifth page, the preceding thread identifies the processing target page as a color page immediately after starting the processing. Therefore, the subsequent thread can skip the DL generation. As a result, the entire job can be accomplished at time t6, which is slightly later than the completion time (see time t5) of the case illustrated in FIG. 6B, in which the partial page parallel processing is exclusively executed.

The thread B1 illustrated in FIG. 6C is an example of a first interpreter. The thread B2 illustrated in FIG. 6C is an example of a second interpreter.

The timing chart illustrated in FIG. 6C has been described based on a case where target pages are all color and the color determination is feasible in the beginning of the page processing. However, if the processing target pages are all monochrome and require monochrome rendering only, the monochrome determination cannot be accomplished before completing the processing for the final page.

Accordingly, in this case, the effect of the parallel processing cannot be obtained because it is unfeasible to skip the DL generation. However, the processing load is light if the processing target is monochrome data, compared to the processing load required for color data. Therefore, even if the processing is delayed, such a drawback is negligible when the engine throughput is taken into consideration.

Further, in a case where the color rendering is performed only at a point on a monochrome page, the page may be identified as a color page at the end of the page processing. However, there will be no problem because it is rare to process such data and by the reasons similar to those described for the monochrome data.

As described in the first exemplary embodiment, if the processing target is a color page, the probability that color discrimination is accomplished at an early stage of the page processing is high. However, if the processing target is a monochrome page, it is difficult to identify the monochrome page before the processing for the page is thoroughly completed. In this respect, a method according to a second exemplary embodiment is satisfactory in color/monochrome determination fidelity as well as in color image quality, while the effect of the parallel processing can be obtained even in a case where a monochrome page is included.

Figure 7C:
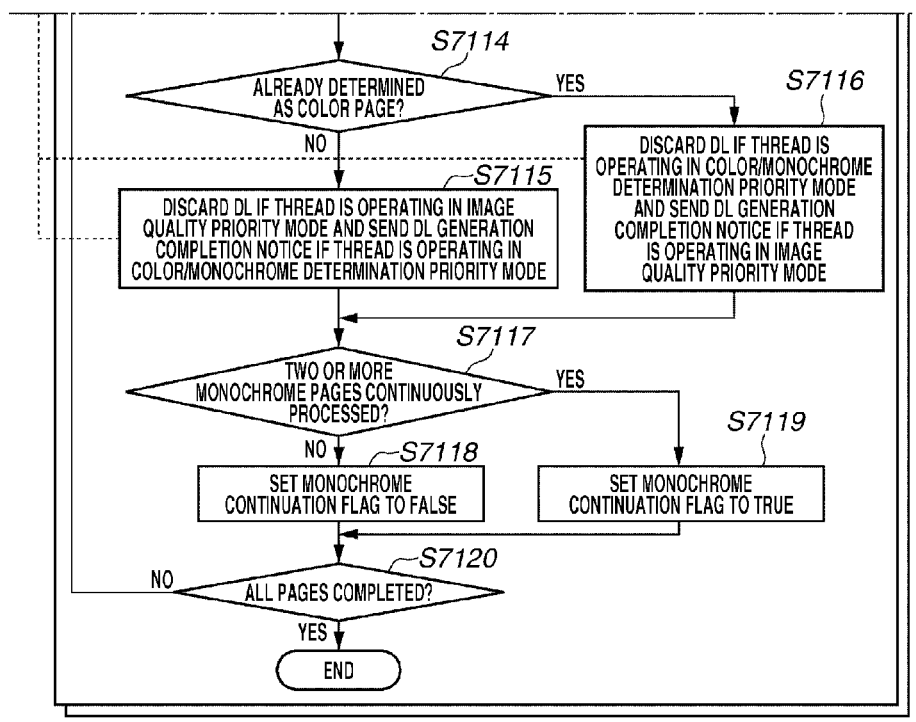
FIG. 7 (7A, 7B, and 7C) is a flowchart illustrating an example method for switching the CMS mode to be set for a preceding thread and a subsequent thread in a case where monochrome pages are continuously processed, in the basic flow of print processing illustrated in FIG. 4.

FIG. 7 is a flowchart illustrating an example method for switching the CMS mode to be set for a preceding thread and a subsequent thread in a case where the number of continuously processed monochrome pages has reached a predetermined number, in the basic flow of print processing illustrated in FIG. 4. In FIG. 7, processing flows for the thread A and the thread C are similar to those illustrated in FIG. 4 and therefore the descriptions thereof are not repeated. Further, a processing flow for the threads B1 and B2 is partly similar to the processing flow illustrated in FIG. 4. However, the processing flow for the threads B1 and B2 includes the following characteristic features.

In the present exemplary embodiment, the predetermined number of pages is two pages. In step S7101 for the thread B1 or the thread B2, the PS interpreter 203 inquires the job control unit 202 about whether the present thread is a thread that starts in advance of the processing for the processing target page. If the present thread is the preceding thread, the PS interpreter 203 sets the image quality priority mode as the CMS mode for the present thread. If the present thread is the subsequent thread, the PS interpreter 203 sets the color/monochrome determination priority mode as the CMS mode for the present thread.

Next, the operation proceeds to step S7102, in which the PS interpreter 203 switches the CMS mode between the image quality priority mode and the color/monochrome determination priority mode if a monochrome continuation flag is true. The monochrome continuation flag is a flag indicating that consecutive monochrome pages precede the processing target page. The monochrome continuation flag can be stored in the RAM 2. Further, a storage area dedicated to the monochrome continuation flag is prepared for each of the thread B1 and the thread B2. The monochrome continuation flag can be set (initialized) to "false" by the job control unit 202 in response to initiation of the processing of the flowchart illustrated in FIG. 7, and can be set to "true" in the processing of the flowchart described below.

Next, the operation proceeds to step S7103, in which the PS interpreter 203 interprets a PS command. Next, the operation proceeds to step S7104, in which the PS interpreter 203 determines whether the processing target page has not been determined as a color page and the PS command based rendering is color rendering. If the determination result in step S7104 is Yes, the operation proceeds to step S7105, in which the PS interpreter 203 identifies the processing target page as a color page.

Next, the operation proceeds to step S7106, in which the PS interpreter 203 determines whether the processing target page has been already determined as a color page. If the determination result in step S7106 is Yes, the operation proceeds to step S7107, in which the PS interpreter 203 determines whether the CMS mode is the color/monochrome determination priority mode. If the determination result in step S7107 is Yes, the operation proceeds to step S7108, in which the PS interpreter 203 skips a DL output operation for the target rendering. If the determination result in step S7107 is No, the operation proceeds to step S7109, in which the PS interpreter 203 executes color conversion processing according to the CMS mode.

Next, the operation proceeds to step S7110, in which the PS interpreter 203 performs a DL output operation for the target rendering. If the determination result in step S7106 is No, the operation proceeds to step S7111, in which the PS interpreter 203 determines whether the processing target page has been already determined as a monochrome page. If the determination result in step S7111 is No, the operation proceeds to step S7109. If the determination result in step S7111 is Yes, the operation proceeds to step S7112, in which the PS interpreter 203 determines whether the CMS mode is the image quality priority mode. If the determination result in step S7112 is Yes, the operation proceeds to step S7108. If the determination result in step S7112 is No, the operation proceeds to step S7109.

The determination result in step S7111 becomes Yes only when either the thread B1 or the thread B2 is a subsequent thread. The preceding thread can identify a monochrome page only when the page processing is completed. Therefore, the operation does not reach step S7111. Further, the determination result in step S7112 becomes Yes only when the subsequent thread is operating in the image quality priority mode. In other words, the determination result in step S7112 becomes Yes only when the CMS mode switching is performed in step S7102.

Next, the operation proceeds to step S7113, in which the PS interpreter 203 determines whether processing for one page has been completed. If the determination result in step S7113 is No, the operation returns to step S7103, in which the PS interpreter 203 repeats the above-described processing. If the determination result in step S7113 is Yes, the operation proceeds to step S7114, in which the PS interpreter 203 determines whether the processing target page has been already determined as a color page. In this case, if the determination result is No, more specifically when the processing target is not yet determined as a color page even after the processing for one page has been completed, it means that the processing target page is a monochrome page.

If the determination result in step S7114 is No, the operation proceeds to step S7115, in which the PS interpreter 203 discards the DL of the processing target page if the thread is operating in the image quality priority. Further, the PS interpreter 203 sends a DL generation completion notice to the job control unit 202 if the thread is operating in the color/monochrome determination priority. If the determination result in step S7114 is Yes, the operation proceeds to step S7116, in which the PS interpreter 203 discards the DL of the processing target page if the thread is operating in the color/monochrome determination priority. Further, the PS interpreter 203 sends a DL generation completion notice to the job control unit 202 if the thread is operating in the image quality priority.

If the determination result in step S7114 is not "color", more specifically, if the PS interpreter 203 determines that the processing target page is a monochrome page, the operation proceeds to step S7115. Next, the operation proceeds to step S7117. In step S7117, the PS interpreter 203 determines whether two or more monochrome pages have been continuously processed. If the determination result in step S7117 is Yes, the operation proceeds to step S7119, in which the PS interpreter 203 sets the monochrome continuation flag to "true." If the determination result in step S7117 is No, the operation proceeds to step S7118, in which the PS interpreter 203 sets the monochrome continuation flag to "false."

If the processing in step S7118, step 7119, or step S7116 has been completed, the operation proceeds to step S7120, in which the PS interpreter 203 determines whether the above-described processing has been completed for all pages. If the determination result in step S7120 is No, the operation returns to step S7101, in which the PS interpreter 203 repeats the above-described processing. If the determination result in step S7120 is Yes, the PS interpreter 203 terminates the processing of the flowchart illustrated in FIG. 7.

Figure 8A:
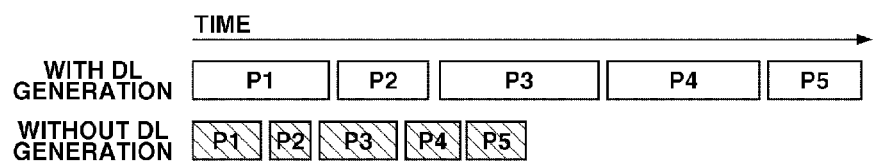
FIG. 8A illustrates processing time required to process specific data of five pages, including a leading color page (i.e., the first page) followed by monochrome pages (i.e., the second to fifth pages), in a case where DL generation is performed and in a case where DL generation is not performed.
Figure 8B:
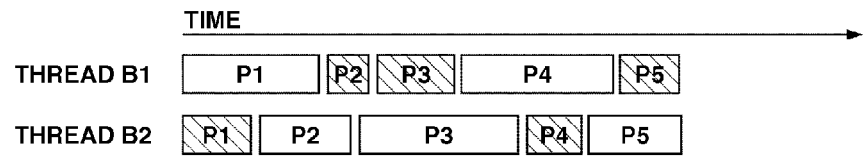
FIG. 8B is a timing chart in a case where the specific data illustrated in FIG. 8A is subjected to only the partial page parallel processing.

An effect obtainable by employing the processing flow illustrated in FIG. 7 is described below with reference to processing examples illustrated in FIGS. 8A to 8C. FIG. 8A is a timing chart illustrating processing for specific data, in which the first page is a color page and the second to fifth pages are monochrome pages, in a case where the DL generation is performed as well as in a case where the DL generation is not performed. FIG. 8B is a timing chart illustrating partial page parallel processing exclusively applied to the specific data illustrated in FIG. 8A. Performing the partial page parallel processing is effective to reduce the output time, as described above using the example illustrated in FIG. 6B.

Figure 8C:
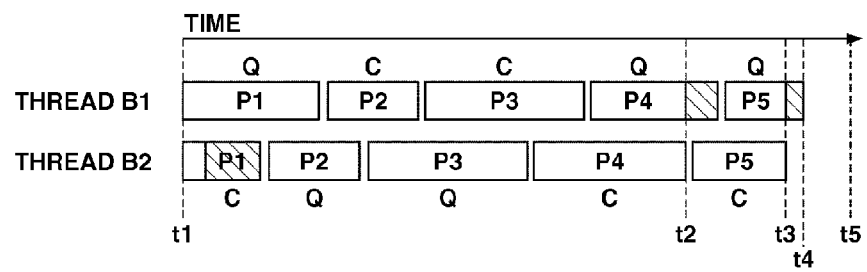
FIG. 8C is a timing chart in a case where the specific data illustrated in FIG. 8A is processed according to the basic flow of print processing illustrated in FIG. 7.

FIG. 8C is a timing chart illustrating the print processing according to the basic flow illustrated in FIG. 7 applied to the specific data illustrated in FIG. 8A. First, at page start time (t1), the CMS mode is set to the image quality priority mode for the thread B1 and the color/monochrome determination priority mode for the thread B2.

In step S7101 of the flowchart illustrated in FIG. 7, the image quality priority mode is set for the preceding thread. Further, at the processing time of the first page, the monochrome continuation flag is "false." Therefore, switching of the CMS mode is not executed.

In the timing chart illustrated in FIG. 8C, "Q" represents a page to which the image quality priority mode has been set and "C" represents a page to which the color/monochrome determination priority mode has been set. The processing target page is identified as a color page immediately after the processing for the first page is started. After that, the thread in the color/monochrome determination priority mode can skip the DL generation.

The thread B2 starts skipping the DL generation at an intermediate point of the first page. Therefore, the thread B2 can process the first page so quickly that the thread B2 can precede the thread B1 in starting the processing for the second page. In the processing for the second page, the image quality priority mode is set for the thread B2 and the color/monochrome determination priority mode is set for the thread B1. In this case, the preceding page is only one color page. Therefore, the monochrome continuation flag remain the same (i.e., "false").

The second page is a monochrome page. Therefore, the color/monochrome determination cannot be accomplished before completing the page processing. Accordingly, none of the threads can skip the DL generation. Each thread requires the same processing time.

One monochrome page precedes the third page, and one color page precedes the monochrome page. Therefore, the monochrome continuation flag remains the same (i.e., "false"). As the second page and the third page are both monochrome, the monochrome continuation flag is set to "true" in the processing for the fourth page. In this case, switching of the CMS mode is executed.

More specifically, the color/monochrome determination priority mode is set for the preceding thread B2 and the image quality priority mode is set for the subsequent thread B1. The thread B2 completes the processing for the fourth page at time t2. At this moment, it can be confirmed that the fourth page is a monochrome page. Accordingly, at the time t2, the required DL generation is completed. The thread B1 skips the DL generation according to the image quality priority mode.

Similarly, two consecutive monochrome pages precede the fifth page. Therefore, the monochrome continuation flag is "true." At time t3, the fifth page can be identified as a monochrome page. The thread B1 skips the DL generation.

In a case where the color/monochrome priority mode is set for the preceding thread, the subsequent thread can skip the image quality priority mode DL generation at the time the processing target is identified as a monochrome page. As described above, even in a case where a monochrome page is included in the data to be processed, it is feasible to skip the DL generation by performing an adaptive control according to the tendency of the data. In other words, even in a case where a monochrome page is included in the data to be processed, the system according to the present exemplary embodiment can realize the processing capable of satisfying both the color/monochrome determination fidelity and the color image quality while bringing parallel processing effects.

Other Exemplary Embodiment

Further, an example of the present invention can be realized by executing the following processing. More specifically, the processing includes supplying a software program that can realize the functions of the above-described exemplary embodiments to a system or an apparatus via a network or an appropriate storage medium, and causing a computer (or a CPU or a micro-processing unit (MPU)) of the system or the apparatus to read and execute the program.

As described above, the exemplary embodiment can satisfy both the color/monochrome determination fidelity and the color image quality, while minimizing the deterioration in performance. Further, the control described in the exemplary embodiment can be realized without greatly modifying the partial page parallel processing method. The man-hour to be required in the installation and maintenance of the software is relatively small.

Although the present invention has been described with reference to preferred embodiments, the present invention is not limited to specific embodiments and can be changed or modified in various ways within the spirit and scope of the present invention as defined by the following claims.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-222119 filed Oct. 6, 2011, which is hereby incorporated by reference herein in its entirety.

What is claimed is:

1. An image forming apparatus comprising:
   first and second interpreters configured to interpret page description language data and generate intermediate data; and
   a mode setting unit configured to set an image quality priority mode to cause one of the first and second interpreters to generate the intermediate data through image quality prioritization processing, and set a color/monochrome determination priority mode to cause the other of the first and second interpreters to generate the intermediate data through color/monochrome determination prioritization processing,
   wherein either the first interpreter or the second interpreter, for which the color/monochrome determination priority mode is set, skips the generation of the intermediate data for a processing target page in a case where it is determined that the processing target page is a color page.

2. The image forming apparatus according to claim 1, wherein
   the page description language data is page description language data that has a dependence relationship between pages, and
   either the first interpreter or the second interpreter, for which the color/monochrome determination priority mode is set, does not skip the interpretation of the page description language for the processing target page in a case where it is determined that the processing target page is a color page.

3. The image forming apparatus according to claim 1, wherein
   the mode setting unit is configured to set the image quality priority mode for one of the first and second interpreters, which is precedent to another interpreter in processing for the processing target page.

4. The image forming apparatus according to claim 1, wherein
   the mode setting unit is configured to set the image quality priority mode for one of the first and second interpreters, which is precedent in processing for the processing target page, to generate intermediate data for a next processing target page through the image quality prioritization processing, after either the first or the second interpreter, for which the color/monochrome determination priority mode is set, has skipped the generation of the intermediate data for the processing target page.

5. The image forming apparatus according to claim 1, further comprising:
   a monochrome continuation setting unit configured to set information indicating continuation of monochrome pages in a case where a predetermined number of monochrome pages are continuously processed,
   wherein the mode setting unit is configured to set the color/monochrome determination priority mode for the first interpreter and set the image quality priority mode for the second interpreter in response to the setting of the information indicating continuation of monochrome pages, in a case where the image quality priority mode is set for the first interpreter and the color/monochrome determination priority mode is set for the second interpreter to generate the intermediate data for the processing target page.

6. An image forming method that can be executed by an image forming apparatus, the method comprising:
   performing first and second interpretation operations to interpret page description language data and generate intermediate data;
   setting an image quality priority mode for one of the first and second interpretation operations to generate the intermediate data through image quality prioritization processing, and setting a color/monochrome determination priority mode for the other of the first and second interpretation operations to generate the intermediate data through color/monochrome determination prioritization processing,
   wherein either the first interpretation operation or the second interpretation operation, for which the color/monochrome determination priority mode is set, includes skipping the generation of the intermediate data for a processing target page in a case where it is determined that the processing target page is a color page.

7. The image forming method according to claim 6, wherein
   the page description language data is page description language data that has a dependence relationship between pages, and
   either the first interpretation operation or the second interpretation operation, for which the color/monochrome determination priority mode is set, does not include skipping the interpretation of the page description language for the processing target page in a case where it is determined that the processing target page is a color page.

8. The image forming method according to claim 6, wherein
   the setting step sets the image quality priority mode for one of the first and second interpretation operations, which is precedent to another interpretation operation in processing for the processing target page.

9. The image forming method according to claim 6, wherein
   the setting step sets the image quality priority mode for one of the first and second interpretation operations, which is precedent in processing for the processing target page, to generate intermediate data for a next processing target page through the image quality prioritization processing, after either the first or the second interpretation operations, for which the color/monochrome determination priority mode is set, has skipped the generation of the intermediate data for the processing target page.

10. The image forming method according to claim 6, further comprising:
    setting information indicating continuation of monochrome pages in a case where a predetermined number of monochrome pages are continuously processed, and
    wherein, in the first setting step, the color/monochrome determination priority mode is set for the first interpretation operation and the image quality priority mode is set for the second interpretation operation in response to a setting in the second setting step of the information indicating continuation of monochrome pages, in a case where the image quality priority mode is set for the first interpretation operation and the color/monochrome determination priority mode is set for the second interpretation operation to generate the intermediate data for the processing target page.

11. A non-transitory computer-readable storage medium storing a program causing a computer to execute an image forming method, the program comprising:

computer-executable instructions for performing first and second interpretation operations to interpret page description language data and generate intermediate data;

computer-executable instructions for setting an image quality priority mode for one of the first and second interpretation operations to generate the intermediate data through image quality prioritization processing, and setting a color/monochrome determination priority mode for the other of the first and second interpretation operations to generate the intermediate data through color/monochrome determination prioritization processing, wherein either the first interpretation operation or the second interpretation operation, for which the color/monochrome determination priority mode is set, includes skipping the generation of the intermediate data for a processing target page in a case where it is determined that the processing target page is a color page.

* * * * *